Nov. 24, 1970  N. O. ASTROM  3,541,764

MULTI-STAGE DUST SEPARATOR

Filed Oct. 23, 1968  3 Sheets-Sheet 2

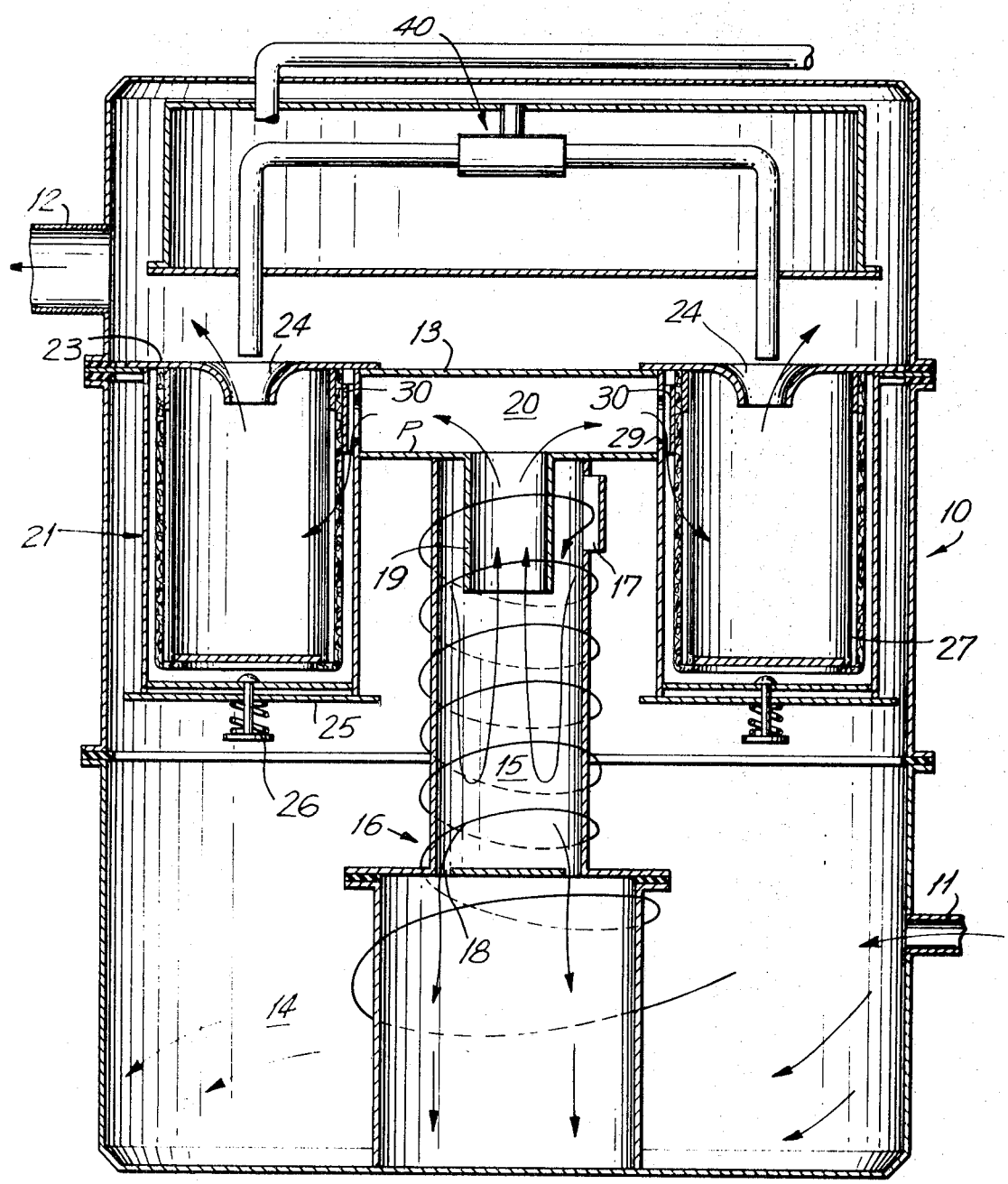

United States Patent Office 3,541,764
Patented Nov. 24, 1970

3,541,764
MULTI-STAGE DUST SEPARATOR
Nils Osten Astrom, Hockertsvagen 17, Bromma, Sweden
Filed Oct. 23, 1968, Ser. No. 770,009
Int. Cl. B01d 46/04
U.S. Cl. 55—302                                                4 Claims

ABSTRACT OF THE DISCLOSURE

A multi-stage dust separator in which dust laden air is passed through first and second sequentially connected chambers in a container, wherein the dust laden air is subjected to successive stages of separation of dust from the air, whereafter the thrust purified air is then fed to a third stage which is composed of a plurality of filter elements arranged in an annular array. Each filter element is composed of a can with a filter therewith in and any dust contained in the air from the second chamber is separated by the filter. Pressure air is periodically blown into the filter elements in succession to clean the filters.

BRIEF SUMMARY OF THE INVENTION

This invention relates to a multi-stage dust separator and to modes of use thereof.

An object of the invention is to provide a multi-stage dust separator which is effective in operation and which can be employed over long periods without interruption due to clogging.

Another object of the invention is to employ a dust separator in a particularly useful arrangement with a pneumatic tool in order to collect the dust from the tool for purposes of separation. According to a characterizing feature of the above arrangement, the exhaust air from the tool is utilized to serve as a suction source for the separator and thereby to transport the dust produced by the tool of the separator.

The dust separator according to the invention comprises a container having an inlet for dust laden air and first and second sequentially connected chambers in which the dust laden air is subjected to successive stages of separation of dust from the air. A plurality of filter elements in the container constitute a third dust separation stage and air is conveyed to the filter elements from the second chamber and is discharged from the filter elements externally of the container. The separator further comprises means for periodically blowing compressed air into the filter elements to clean the same and prevent clogging thereof.

An important feature of the invention is to subject the dust laden air to two stages of dust separation before the filters are supplied with the air. Thereby, the dust separation load on the filters is limited to the removal of fine dust and hence clogging of the filters is avoided. Moreover, the separation in all of the stages is achieved in a single container of relatively compact size in which the flow of air is continuous.

In a particular embodiment, each filter element is constructed as a can containing a filter supported within the can in spaced relation therewith, such that when compressed air is blown into the filter element dust on the filter drops to the bottom of the can. At the bottom of the can is a spring-loaded flap which is normally closed, but which is opened in opposition to its spring action under the effect of the compressed air. A valve is positioned at the inlet of each can to close the same when compressed air is introduced into the can thereby to prevent egress of compressed air from such can into other cans which would adversely affect the filtering operations taking place therein.

In further accordance with the invention, the dust separator can be utilized in combination with a pneumatic tool which has an outlet for exhaust air under pressure and which is associated with suitable means by which exhaust air from the tool serves as a suction source for the dust separator. A dust exhaust conduit leads from a work zone of the tool, whereat dust is generated, to the inlet of the dust separator.

BRIEF DESCRIPTION OF THE DRAWING

FIG. 4 is an elevational view in cross-section of the separator of FIG. 1; and

DETAILED DESCRIPTION

Figure 1:
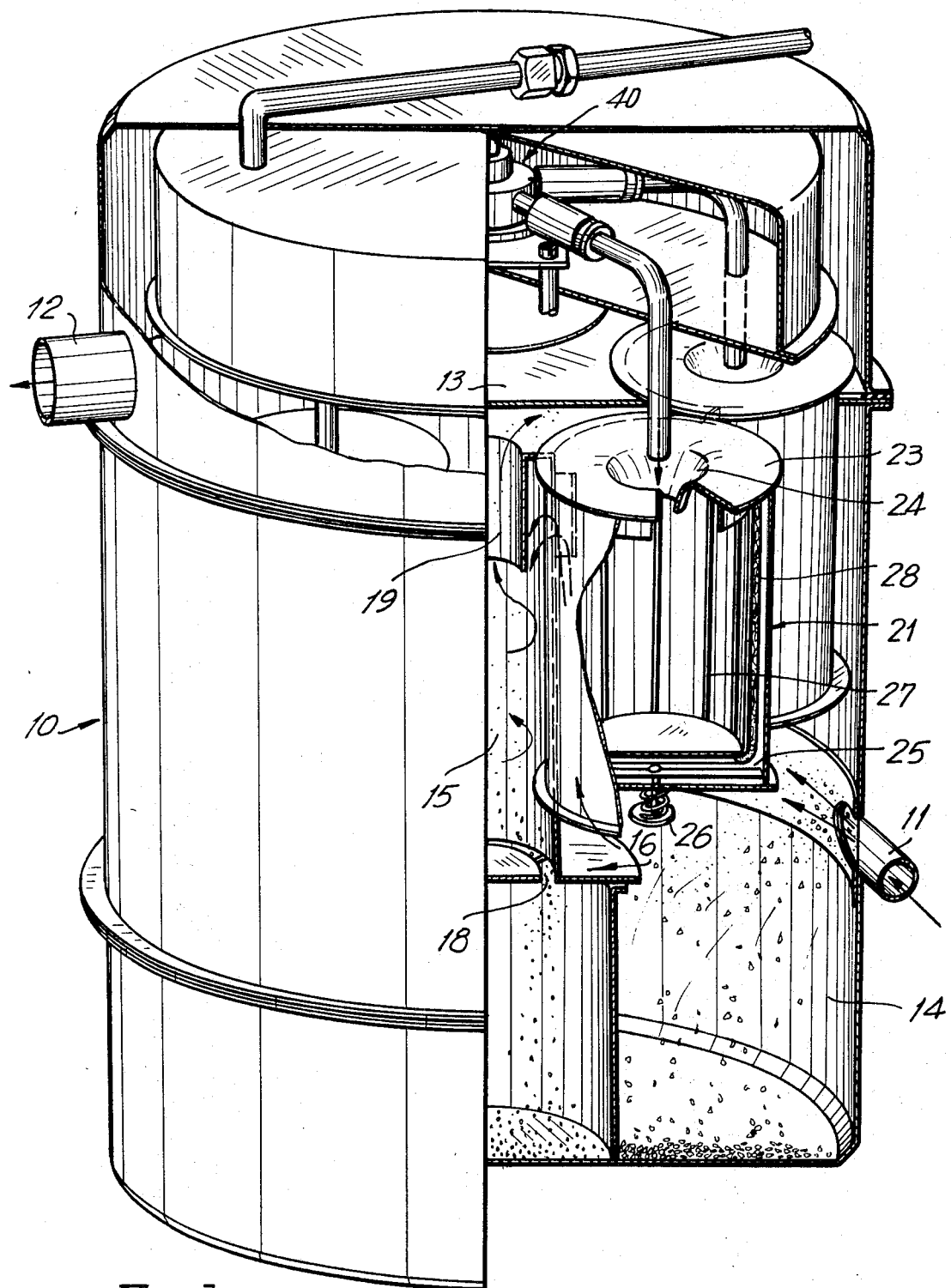
FIG. 1 is a perspective view, partly broken away and in section, of a dust separator according to the invention.
Figure 2:
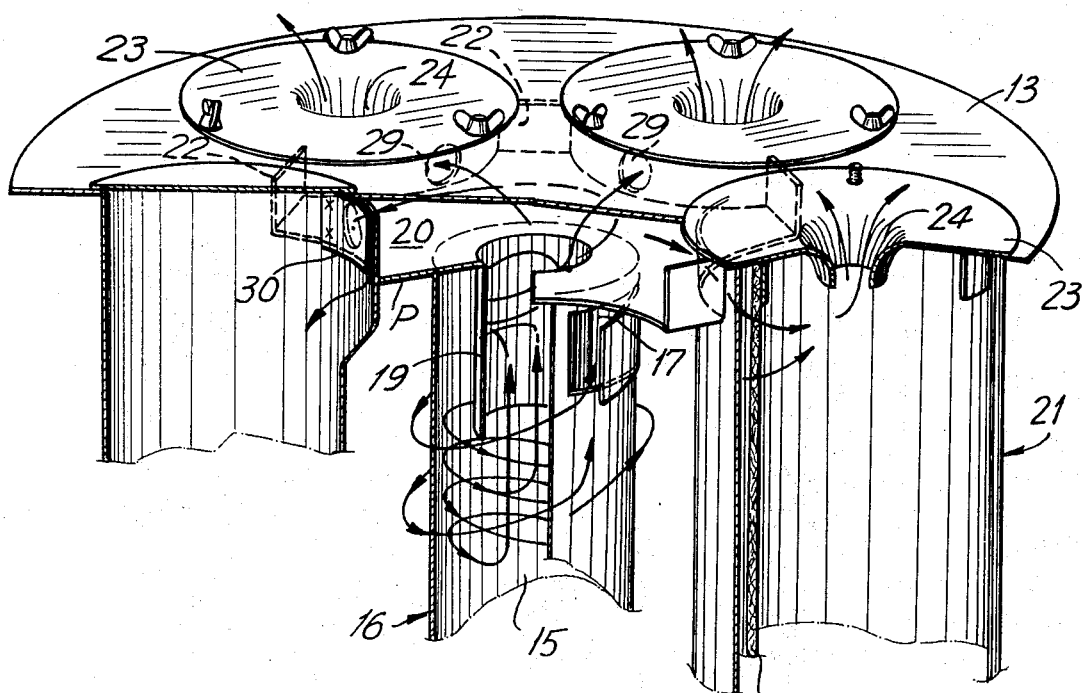
FIG. 2 is a perspective view of a portion of the separator of FIG. 1 partly broken away and in section.
Figure 3:
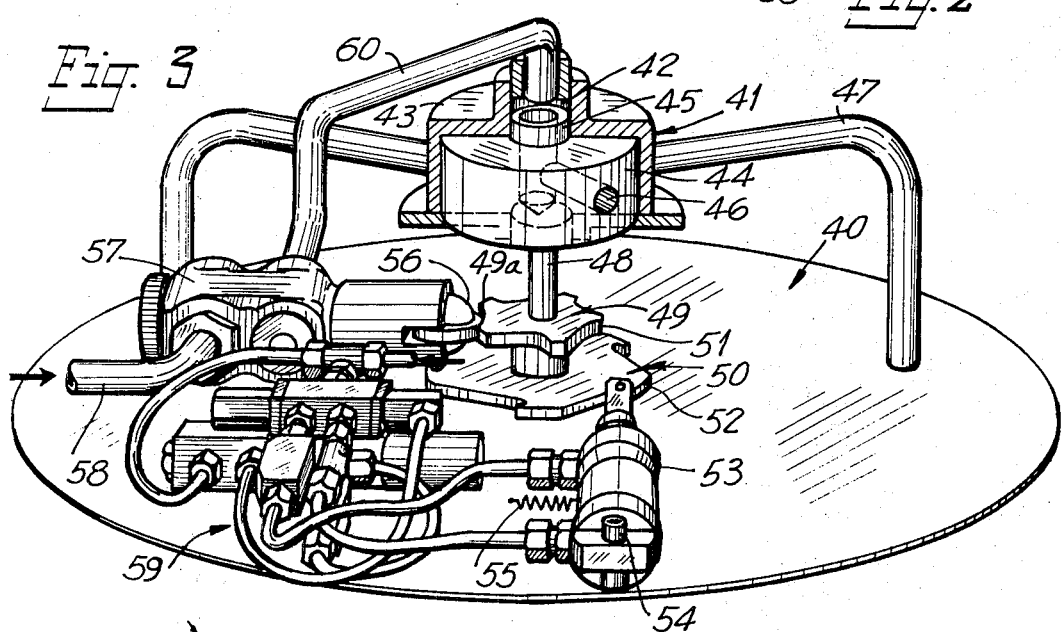
FIG. 3 is a perspective view, partly broken away and in section, of a portion of the dust separator of FIG. 1 for the introduction of compressed air into the filter elements.

Referring to the drawing, therein is shown a multi-stage dust separating and collecting apparatus which comprises a main container 10 provided with an inlet 11 for dust laden air arranged tangential to the side of the container, and an outlet 12 for purified air. The outlet 12 is connected to a source of suction. Housed within the container 10 beneath a separating partition or deck 13 is a first dust separator or separating chamber 14 and a second dust separator or separating chamber 15. The second dust separating chamber 15 is formed within an annular wall 16 and the first chamber 14 is formed between wall 16 and the container 10. Dust laden air is fed into the first dust separating chamber 14 via the tangential inlet 11, which imparts a swirling motion to the air flow causing separation of the heavier particles and their deposit to the bottom of the container. The air then passes via an inlet 17 (FIG. 2) at the top of wall 16 to the second dust separating chamber 15, in which a very high percentage (more than 99.5%) of the remaining dust in the air is separated therefrom, and falls to the bottom of the main container 10, through openings 18 between the floor of chamber 15 and the wall 16 thereof. The air passes from chamber 15 through a tube 19 therein into a distributor having a space 20 formed between partition 13 and a plate P from which wall 16 depends. The space 20 is bounded by a plurality of filter cans 21 arranged in a circular array within the container 10 and connected together by wall elements 22 (FIG. 2). The filter cans serve as a third dust separator or separation stage. Each can is fitted with a cap 23 which presents an opening 24 leading into the interior of the can 21. Located at the bottom of each can 21 is a hinged flap 25 which is held in closed position by a spring 26 which is offset from the flap hinge. Located within each can 21 is a filter bag holder 27 on which a filter bag 28 is mounted. The filter bag holder 27 is arranged in the filter can 21 so as to leave a space between the outer wall of the holder 27 and the inside wall of the filter can 21. The air leaving the second stage, i.e., the second dust separating chamber 15 passes into the filter cans 21 of the third dust separating stage via air inlets 29 situated beneath the rim of the cap 23. Adjacent each inlet 29 in the respective can is a valve 30 which is in the form of an elastic blade connected to the can at one end so that the blade is biased by its own resilience away from the position in which it closes the inlet 29. The valve 30 is capable of closing the inlet 29 in a manner which will be described later, and the valve 30 also serves to deflect the air downwardly into the cans 21. The air passes through the filter bags on the holders 27, whereupon a very high percentage of the remaining dust in the air is removed, while the purified air is discharged via the openings 24 and the outlet conduit 12.

As is obvious, a portion of the dust separated by the filter bags will settle on the walls of the bags and, in time, cake the openings and impair the efficiency of the bags. To provide for cleaning of the filter bags at regular determined intervals, the apparatus according to the invention also includes an air injecting mechanism, indicated generally at 40, which at determined intervals causes abrupt jets of compressed air to be injected into each filter can 21 in sequence. In the shown embodiment, the air injecting mechanism includes a compressed air distributing valve 41 provided with an inlet 42 for compressed air. The valve 41 comprises a stationary housing 43, a rotating valve body 44 in said housing and a seal ring 45. Arranged in the wall of the rotating valve body 44 is a bore 46 which upon determined positions of rotation of the valve body 44 registers with one of a number of conduits 47 leading to the filter cans 21. The rotating valve body 44 is secured to a downwardly extending rotatable shaft 48. Secured in spaced relationship at the bottom end of the shaft 48 are two operating members 49 and 50 which have respective peripheral surfaces, each with a number of outwardly projecting surfaces 51 and 52 respectively. The operating member 50 is in cooperating engagement with one end of a piston-cylinder arrangement 53. The piston-cylinder arrangement 53 is supported by a pivot 54 and is elastically urged by a spring 55 in a counterclockwise direction about pivot 54. Said one end of the piston of arrangement 53 acts against the side edge of one of the projecting surfaces 52 so that forward movement of the piston in the cylinder causes the member 50 to be rotated through a determined angular distance while the arrangement pivots about pivot 54 against the action of the spring 55. When the piston is retracted, the arrangement 53 is returned so that it can engage the next projecting surface of member 50. Thus, reciprocal movement of the piston of arrangement 53 serves to stepwise rotate operating member 50. Rotation of the operating member 50 causes rotation of the shaft 48 and hence rotation of operating member 49 and the rotating valve body member 44.

The projecting surfaces 51 of the operating member 49 are arranged so that a depressed seat 49a is formed between adjacent surfaces 51. This seat receives a piston actuating member 56 of a piston-cylinder arrangement 57. The actuating member 56 acts on one end of a piston rod (not shown) of arrangement 57, against the pressure of a spring (not shown) situated on the piston rod in the vicinity of the actuating member 56, but within the cylinder of arrangement 57. Thus, as the member 49 rotates, the actuating member 56 will undergo reciprocatory movement.

Compressed air is introduced from an external source (not shown) into the piston-cylinder arrangement 57, through a compressed air conduit 58. When compressed air is fed to the piston-cylinder arrangement 53, from a source indicated generally by numeral 59, the piston moves forward and causes the operating member 50 to rotate through a predetermined angular distance. As previously mentioned, this causes the shaft 48 to rotate a corresponding extent and bring the bore 46 in alignment with one of conduits 47. During rotation of the member 50 and shaft 48, piston actuating member 56 is forced out of its seating 49a on the operating member 49 carried by the shaft 48 and follows the camming edges of the projecting surfaces 51 to displace the piston of arrangement 57 in opposition to the spring acting thereon and uncover a conduit 60 which supplies compressed air to valve 41 and thereby to the particular filter can 21 which is in communication with the conduit 47 facing the bore 46. It should be noted that the operating members 49 and 50 are so synchronized that a jet of compressed air is injected into a can 21 immediately when the bore 46 registers with the conduit 47. The compressed air source 59 is connected to a regulating means (not shown), to facilitate regulation of compressed air to the piston-cylinder arrangement 53.

The jet of compressed air injected into the can 21 acts on the spring blade valve member 30 to close the inlet 22, thus preventing egress of air from can 21 which could flow to the other cans and adversely affect the filtering action taking place therein. The compressed air injected in the filter cans 21 passes through the walls of the filter bags on the filter bag holders 27, causing loosening of the dust on the walls of the bag whereby the dust falls between the wall of said bag and the wall of the filter can onto the hinged flap 25. When the pressure inside the filter bag exceeds a determined value, determined by the strength of the spring 26, the flap is pushed down to allow the dust to fall to the bottom of the main container 10, from where it can be periodically removed as desired. When the flap 25 opens, the compressed air also escapes from the can 21 and relieves the pressure on the member 30 that the valve member elastically returns to its rest position in which the inlet 29 is uncovered.

The flow of air in the dust separator is as follows. The dust laden air enters inlet 11 along a tangential path and flows into chamber 14. The dust particles drop to the bottom of the container 10 and the purified air flows upwardly along a helical path to inlet 17 and the air enters chamber 15 and is deflected downwardly by tube 19 such that much of the remaining dust particles fall through openings 18 to the bottom of container 10, while the purified air passes through tube 19 into space 20. Therefrom the air enters openings 29 in cans 21 and passes through filters 28 where the last of the dust is removed. The finally purified air passes out of the cans via openings 24 into the space above deck 13 wherefrom the air is removed through suction outlet 12.

Figure 5:
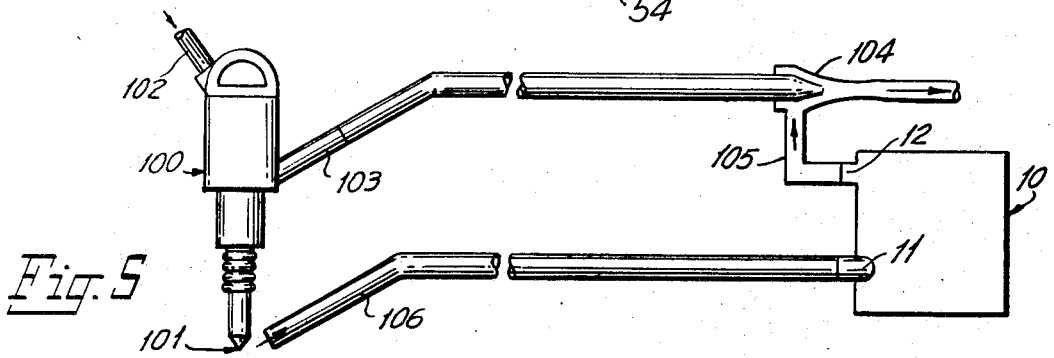
FIG. 5 is a diagrammatic illustration showing one mode of use of the dust separator.

In a particularly effective arrangement, the dust separator previously described can be used in conjunction with a pneumatic tool 100, as shown in FIG. 5, in order to collect the dust laden air, produced at the work zone 101 by the tool, and separate the dust from the air.

The tool 100 can be any type of pneumatic, eroding work tool such as a drill, grinder, chisel or the like. A compressed air hose 102 is connected to the tool to operate the same, and an exhaust hose 103 conveys exhaust air from the tool. An injector 104 is connected to hose 103 in order to produce suction pressure within conduit 105 connected to outlet 12 of the separator 10. Thus, the exhaust air from the tool is utilized as a source of suction for the operation of the separator. A dust conduit 106 extends from the work zone 101 of the tool to the inlet 11 of the separator, whereby dust produced at the work zone is transported to the separator under the action of the exhaust air from the tool. Thus, the exhaust air not only serves to operate the separator but it also effects transfer of the dust from the work zone to the separator.

In lieu of the ejector, as shown at 104, any suitable means for increasing the velocity of the air flow in hose 103 can be employed as, for example, orifices, constrictions and the like.

What is claimed is:

1. A multi-stage dust separating apparatus comprising a cylindrical container with a bottom serving as a dirt collector, said container having an inlet for dust-laden air at a distance from said bottom, said container including a circular partition in the upper part thereof, and a cyclone separator extending downwardly in said container and radially inwards of said inlet, said separator having a bottom which is provided with an outlet for separated dust and with at least one peripheral air inlet communicating with the interior of said container and said inlet thereof, a tube depending in said separator at the top thereof and being in communication therewith, an air distributor connected to said tube for outflow of air therefrom, an exhaust chamber arranged above said partition and being provided with an outlet to the atmosphere, a plurality of further separators each provided with a tubular housing having a central bag-like filter chamber, said further separators being supported in the container at radial distances from the center thereof in an annular arrangement, said further separators having inlet openings at the top thereof connected to said distributor, said further separators having bottoms each with a resiliently mounted dust discharge flap which is normally closed but is pivotable to an open position upon a predetermined air pressure in said further separators, flow ducts passing through said partition to provide a flow passage connecting each said filter chamber with said exhaust chamber, one air jet nozzle opening into each said flow passage, and valve means for connecting the air jet nozzles one by one during short periods of time to a source of compressed air, said cyclone separator which extends downwardly in said container being open at the bottom thereof, and a separate collecting vessel beneath the bottom of said cyclone separator and in sealed relation therewith for receiving dust separated in this cyclone separator.

2. A dust separating apparatus as claimed in claim 1 comprising a resilient vane at each inlet opening of the further dust separators, each said resilient vane being supported in a normally open position wherein it guides air into the associated separator but is urged to shut said opening by increased air pressure in the separator caused by the introduction of a jet of compressed air from said air jet nozzles.

3. A dust separating apparatus as claimed in claim 1 comprising conduits for said nozzles leading to said flow passages, a distributing valve having a communication passage arranged for stepwise rotary motion between said conduits, a control valve selectively connecting said communication passage with a source of compressed air, said valve having synchronized operation when the movement of the communication passage registers with the opening of a conduit so that a pulse of compressed air is propagated to the corresponding filter chamber through the filter wall thereof.

4. A dust separator as claimed in claim 3 comprising a rotatable shaft, the communication passage extending radially outwards from said shaft and rotatable therewith, a ratchet wheel on said shaft, a reciprocating motor engaging said ratchet wheel for turning said passage in stepwise fashion and a cam wheel on said shaft which engages said control valve to open and close the same in pre-determined steps.

References Cited
UNITED STATES PATENTS

| | | | |
|---|---|---|---|
| 809,408 | 1/1906 | Thurman | 55—468 |
| 2,182,165 | 12/1939 | Smith | 55—468 |
| 2,975,847 | 3/1961 | Feucht | 55—341 |
| 3,008,542 | 11/1961 | Steele | 75—340 |
| 3,080,694 | 3/1963 | Smith | 55—293 |
| 3,177,635 | 4/1965 | Cowl et al. | 55—337 |
| 3,332,217 | 7/1967 | Rymer | 55—302 |
| 3,362,535 | 1/1968 | Kasten | 210—323 |

FOREIGN PATENTS

| | | |
|---|---|---|
| 229,236 | 8/1963 | Austria. |
| 549,921 | 12/1957 | Canada. |

OTHER REFERENCES

Mikro Pulsaire Bulletin PC-1, Pulverizing Machinery, New Jersey, pp. 1–12, Apr. 25, 1966.

FRANK W. LUTTER, Primary Examiner

B. NOZICK, Assistant Examiner

U.S. Cl. X.R.

55—337, 341, 418, 432, 468